(12) United States Patent
Filippi et al.

(10) Patent No.: US 7,087,205 B2
(45) Date of Patent: *Aug. 8, 2006

(54) METHOD FOR CARRYING OUT CHEMICAL REACTIONS IN PSEUDO-ISOTHERMAL CONDITIONS

(75) Inventors: Ermanno Filippi, Castagnola (CH); Enrico Rizzi, Grandate (CH); Mirco Tarozzo, Ligornetto (CH)

(73) Assignee: Methanol Casale S.A., Besso (CH)

( * ) Notice: Subject to any disclaimer, the term of this patent is extended or adjusted under 35 U.S.C. 154(b) by 615 days.

This patent is subject to a terminal disclaimer.

(21) Appl. No.: 10/082,264

(22) Filed: Feb. 26, 2002

(65) Prior Publication Data
US 2002/0117294 A1   Aug. 29, 2002

(30) Foreign Application Priority Data
Feb. 27, 2001   (EP)   ............................. 01104757

(51) Int. Cl.
  *B01J 8/04*   (2006.01)
  *B01J 19/00*   (2006.01)
  *F28D 9/00*   (2006.01)

(52) U.S. Cl. ................. 422/198; 422/200; 422/211; 165/100; 165/104.19; 165/157; 165/177; 165/178

(58) Field of Classification Search ............... 422/200, 422/198, 211; 165/157, 177, 178, 100, 104.19
See application file for complete search history.

(56) References Cited

U.S. PATENT DOCUMENTS

| | | | | |
|---|---|---|---|---|
| 5,035,867 A | * | 7/1991 | Dang Vu et al. | ........... 422/200 |
| 5,270,127 A | * | 12/1993 | Koga et al. | .................... 429/17 |
| 5,324,452 A | * | 6/1994 | Allam et al. | ................ 252/373 |
| 5,681,538 A | * | 10/1997 | Sung et al. | .................. 422/211 |
| 6,389,696 B1 | * | 5/2002 | Heil et al. | ............. 29/890.039 |
| 6,848,501 B1 | * | 2/2005 | Hirao et al. | ................. 165/119 |
| 2002/0088613 A1 | * | 7/2002 | Filippi et al. | ............... 165/182 |
| 2004/0018124 A1 | * | 1/2004 | Filippi et al. | ............... 422/181 |
| 2004/0204507 A1 | * | 10/2004 | Filippi et al. | ............... 518/726 |
| 2005/0061490 A1 | * | 3/2005 | Filippi et al. | ............... 165/145 |

* cited by examiner

*Primary Examiner*—N. Bhat
(74) *Attorney, Agent, or Firm*—Sughrue Mion, PLLC

(57) ABSTRACT

Method for carrying out in continuous, under so-called pseudo-isothermal conditions and in a predetermined reaction environment, such as a catalytic bed, a selected chemical reaction, comprising the steps of providing in the reaction environment at least one heat exchanger fed with a first flow of a heat exchange operating fluid at a respective predetermined inlet temperature, the fluid passing through at least one heat exchanger according to a respective inlet/outlet path, which method also provides feeding into at least one heat exchanger and at one or more intermediate positions of said path, a second flow of operating fluid having a respective predetermined inlet temperature.

6 Claims, 3 Drawing Sheets

METHOD FOR CARRYING OUT CHEMICAL REACTIONS IN PSEUDO-ISOTHERMAL CONDITIONS

FIELD OF APPLICATION

In its broader aspect, the present invention relates to a method for carrying out chemical reactions in pseudo-isothermal conditions, that is to say under conditions in which the reaction temperature is controlled in a narrow range of values around a predetermined optimum value.

In particular, this invention relates to a method of the above mentioned type for controlling the temperature of catalyzed reactions, based upon the use of heat exchangers immersed in the reaction environment, for example in a catalytic bed, in which a selected chemical reaction takes place.

Still more in particular, although not exclusively, the present invention relates to a method in which the reaction temperature control is obtained by using plate exchangers immersed in a catalytic bed and internally passed through by a suitable heat exchange operating fluid.

The present invention also relates to a heat exchanger having a suitable structure for carrying out the above-mentioned method.

PRIOR ART

As known, for exothermal or endothermic chemical reactions, such as the synthesis reactions of methanol, formaldehyde or styrene, to be satisfactorily completed, it is necessary to respectively remove or provide heat to the environment in which the reaction is taking place, so as to control its temperature in a narrow range around a predetermined theoretical value.

Likewise, it is known that for the above mentioned purpose, heat exchangers of the most various types are widely used, which are immersed in the reaction environment (usually a catalytic bed) and passed through internally by a suitable heat exchange operating fluid.

The pseudo-isothermal degree of the reaction, that is to say the degree of progress or completion of the reaction itself, depends on the way such heat exchangers are used, on their functionality, on the effectiveness with which the heat is provided to or removed from the reaction environment (thermal yield).

Although advantageous as far as some aspects thereof are concerned, the methods of the prior art, used so far to carry out chemical reactions in pseudo-isothermal conditions have a known drawback, which in the industry forms a limit to the degree of progress or completion of the reaction itself.

In fact, the operating fluid which passes through a heat exchanger according to a predetermined inlet/outlet path, necessarily undergoes a substantial temperature variation by exchanging heat with the environment (for example a catalytic bed) in which said heat exchanger is arranged.

To such temperature variation of the operating fluid, that is substantially continuous along said path, unavoidably corresponds a continuous decrease of the operating effectiveness of the heat exchanger.

In fact, the heat exchange between the operating fluid and the reaction environment is not homogeneous along the walls of the heat exchanger, but tends to decrease there, where the temperature difference between the internal and external fluid decreases.

Accordingly, the pseudo-isothermal degree of the reaction conditions achieved by the methods and the exchangers of the prior art, is characterized by a reaction temperature, which is controlled in an always relatively wide range of values around the one corresponding to the isotherm of reference. To this situation is also associated a limited degree of completion of the considered chemical reaction.

SUMMARY OF THE INVENTION

The technical problem underlying the present invention is that of providing a method for carrying out chemical reactions in so called pseudo-isothermal conditions, based upon the use of heat exchangers, which are active in the environment in which a predetermined reaction is carried out, and adapted to maintain a predetermined constant value of the reaction temperature or anyway to control said temperature in a very narrow range of values so as to substantially increase the degree of progress or completion of the reaction with respect to what has been possible so far with the methods of the prior art.

The idea for solving said problem is that of controlling the temperature of a heat exchange operating fluid at the aforesaid predetermined value as it passes through the respective heat exchanger.

According to such idea, the above indicated technical problem is solved according to the invention by a method for carrying out in continuous under pseudo-isothermal conditions and in a predetermined reaction environment, such as a catalytic bed, a selected chemical reaction, comprising the steps of providing in said reaction environment at least one heat exchanger fed with a first flow of a heat exchange operating fluid at a predetermined inlet temperature, said operating fluid passing through said at least one heat exchanger according to a respective inlet/outlet path; which method is characterized by:

feeding into said at least one heat exchanger and at one ore more intermediate positions of said path, a second flow of operating fluid having a respective predetermined inlet temperature.

By suitably selecting the inlet temperature of the second flow and the number of said intermediate positions, wherein a mixing of said second flow with the fluid of said first flow takes place, it is possible to bring the temperature of the operating fluid back to the inlet temperature or at least to a temperature very close thereto. Therefore, it is possible to control the temperature of the heat exchange operating fluid within a very narrow range of values around a predetermined value, if not even to maintain the temperature of said fluid substantially constant, while passing through the respective exchanger.

Moreover the invention relates to a heat exchanger having structural and functional features adapted to carry out the aforesaid method.

The features and the advantages of a method according to the invention will become clearer from the following description of an indicative and non-limiting example of embodiment thereof, made with reference to the attached drawings.

DETAILED DESCRIPTION OF THE DRAWINGS

Figure 1:
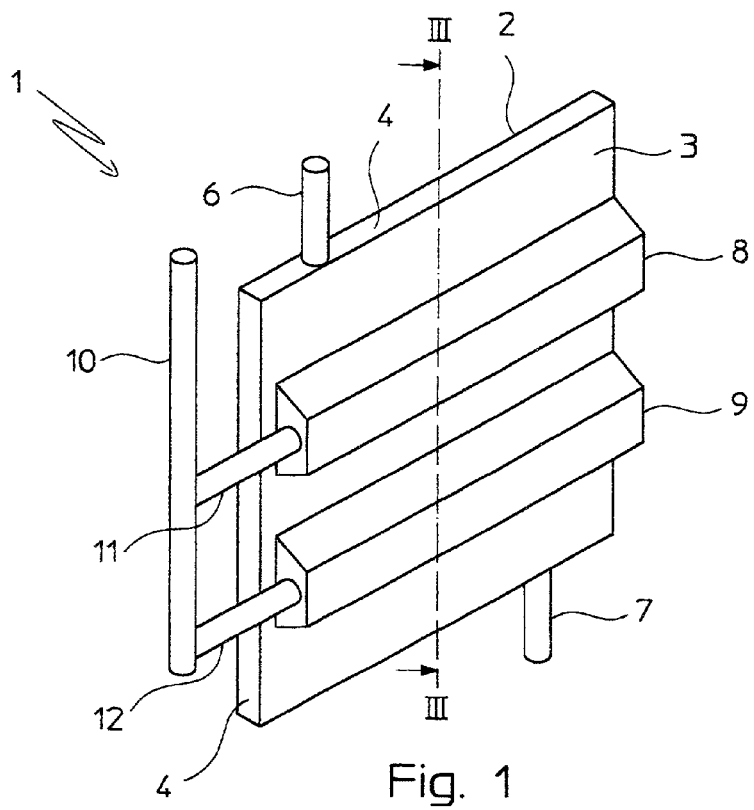
FIG. 1 shows schematically an axonometric view of a heat exchanger that can be used for carrying out the method according to the present invention.

With reference to the aforesaid figures, a heat exchanger used for carrying out the method of the present invention is indicated in its whole with reference numeral 1.

Said heat exchanger 1, which just for schematic and simplicity reasons has a flat parallelepiped configuration, comprises two wide walls 2 and 3, preferably made of metallic plates, substantially flat and juxtaposed, adjoined in a predetermined spaced relationship through perimetric walls 4 of reduced width.

Between said walls 2, 3 and 4, a chamber 5 is defined, intended for communicating on one side with a source (not shown) of a heat exchange operating fluid, through a fluid inlet connector 6, and on the other side with a manifold (also not shown) for discharging said fluid, through a fluid outlet connector 7.

Through means such as baffles, dividing walls and the like, that are not shown as conventional, a path for said operating fluid is defined in said chamber 5. The path extends between said connectors 6, 7 and is designed in such a way that it is in contact with the entire opposite walls 2, 3 of said heat exchanger 1.

Two (or more) identical distributors 8, 9 are fastened to one of said walls of the heat exchanger 1, for example to the wall 3, and in predetermined intermediate positions of said path. Said distributors 8, 9 extend in parallel to each other at predetermined distances from the fluid inlet and outlet connectors 6 and 7, respectively.

The distributors 8 and 9, which are in reciprocal spaced relationship, are in fluid communication with said chamber 5 of the heat exchanger 1 on one side, and with a duct 10 for feeding operating fluid, through connectors 11 and 12, respectively, on the other side.

In particular, according to a preferred embodiment (FIG. 2), each distributor 8, 9 comprises a plurality of through holes 13 formed in said wall 3 and regularly arranged in at least a rectilinear alignment, that extends longitudinally to the distributor (8, 9) itself and to a casing 14. The casing 14 is essentially of channel shape that when fixed to the wall 3 to cover said plurality of holes 13, forms with it an operating fluid distributing chamber 15 as will be clear from the following description.

According to the method of the present invention, in order to control the temperature of a chemical reaction, for instance the strongly exothermal synthesis of methanol, a plurality of heat exchangers 1 of the above described type is suitably arranged in the environment where said reaction has to take place in continuous, such as in a selected catalytic bed.

Each of said exchanger 1 is connected on one side to a source (not shown) of heat exchange operating fluid, through the respective fluid inlet connector 6, and on the other side to a common discharge manifold (not shown), through the respective fluid outlet connector 7.

The distributors 8, 9 of each heat exchanger are in turn connected to said operating fluid source through the duct 10.

Once this preliminary step has been carried out, the selected chemical reaction can be started.

During the reaction, the heat generated or absorbed therefrom is at least partially removed or provided to the reaction environment, respectively, through the plurality of exchangers 1. The exchangers 1 put in heat exchange relationship said environment with a first flow of operating fluid fed into each of said exchangers through the respective inlet connectors 6.

The flow rate of said first flow, as well as the temperature of said operating fluid, are computed in advance, in a per se known way, according to the chemical and kinetic characteristics of the specific reaction, taking into account that the heat exchange "yield" (and hence the reaction progress degree) is also a function of the difference of temperature existing between the reaction environment and the operating fluid.

At the area of said exchangers 1, which are closer to the respective inlet connectors 6, where said temperature difference is at its maximum, we can find the maximum heat exchange yield. However, just because of said heat exchange, the temperature of the operating fluid varies as it flows away from the inlet connectors, in its path through the exchangers, thus tending to match up the temperature of the reaction environment.

In order to avoid that, due to the above variation, the temperature of the operating fluid "falls out" from a predetermined range of values, which is desirably narrow around a value computed in advance, according to the present invention a second flow of operating fluid is fed into each exchanger, through the feeding duct 10 and the plurality of distributors 8, 9, respectively.

Of course, the fluid temperature of this second flow is selected in such a way that, when mixing the two flows inside the exchangers at the position of the distributors, the same will be as close as possible to the inlet temperature of the first flow.

With the method of the present invention, with a suitable selection of the temperature of the second flow and of the number and position of the distributors 8, 9 in each exchanger, it is thus possible to control the temperature of the heat exchange operating fluid within a predetermined range of values during its path through a heat exchanger.

Given the tight correlation between the temperature of the reaction environment and that of the heat exchange fluid, which operates in such environment, it is likewise possible to control the temperature of the reaction environment, which substantially corresponds to the temperature of reaction.

A further advantage resulting from the present invention is provided by the possibility of controlling the heat exchange coefficient between the operating fluid flowing in a heat exchanger and a reaction fluid flowing in the reaction environment.

In fact, by feeding the operating fluid into the heat exchanger through a plurality of separated flows, it is possible to vary in an independent way the flow rate and velocity of such flows and thus to suitably control the flow rate and velocity of the operating fluid inside the heat exchanger.

As these parameters directly influence the heat exchange coefficient, that is to say: the higher is the flow rate and velocity of the operating fluid, the higher is the heat exchange coefficient, and vice versa, thanks to the present invention it is thus possible to obtain the desired heat exchange along the entire heat exchanger, thus being able to control optimally the progress of the chemical reaction.

Figure 4:
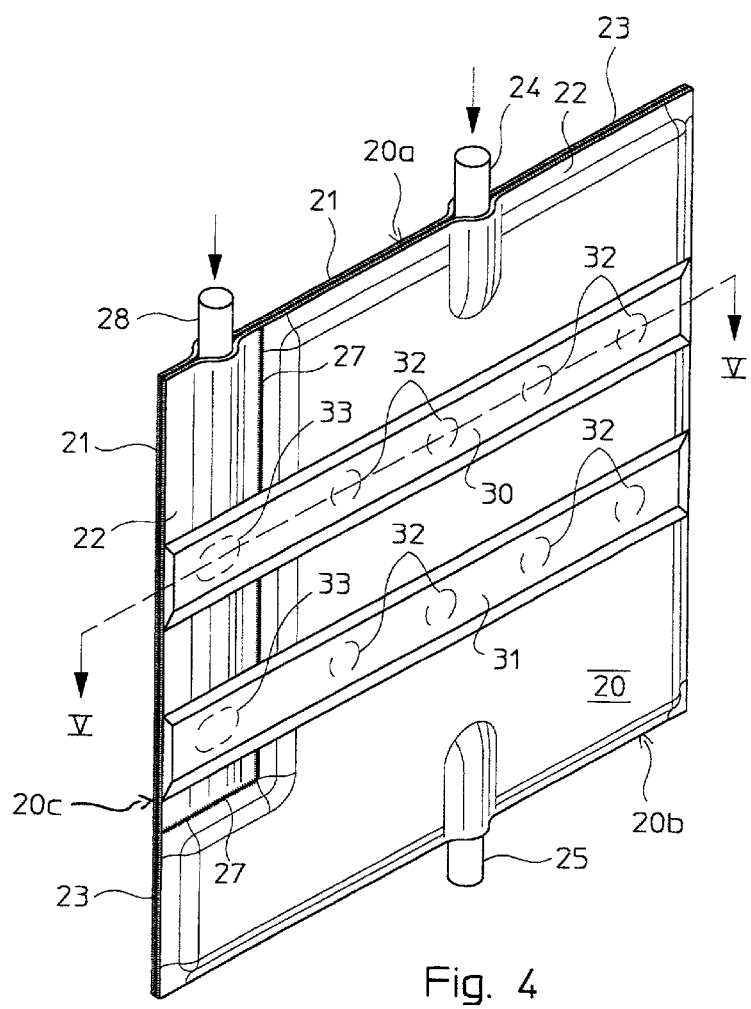
FIG. 4 shows a schematic and perspective view of an alternative embodiment of the exchanger of FIG. 1.
Figure 5:
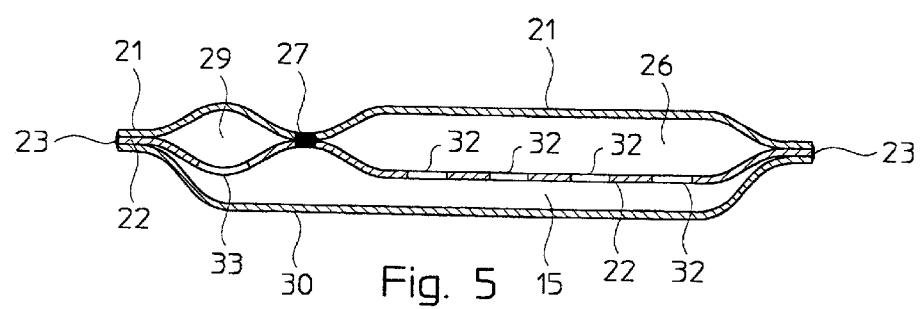
FIG. 5 shows a section view along the line V—V of FIG. 4.

With reference to FIG. 4 and according to a preferred and advantageous embodiment of the heat exchanger of the present invention, the feeding duct of the second flow of operating fluid is defined by the structure itself of the heat exchanger.

In particular, the heat exchanger 20 comprises two metallic plates 21, 22 of reduced thickness so as to be capable of being deformed plastically, mutually adjoined in substantial juxtaposition by means of a perimetric weld 23.

The weld 23 is carried out already taking into account, at opposite sides 20a, 20b of said plates, of the presence of inlet and outlet connectors 24 and 25 for an operating fluid, respectively.

Said plates 21 22 are further connected with each other by means of a substantially L-shaped welding line 27, extending parallel to a side 20c of the heat exchanger 20, without fluid inlet or outlet connectors, and at a reduced distance therefrom. On the side 20a of the heat exchanger 20, and at said weld 27, a third connector 28 is provided, for the inlet of a second flow of operating fluid, as it will become clearer from the following description.

Through elastic deformation of said plates 21, 22, obtained for example by blowing a pressurized gas between them, a chamber 26 intended to be passed through by a heat exchange operating fluid as well as a duct 29 for feeding said second flow of operating fluid are formed. Said duct 29 extends in the area comprised between said L welding line 27 and the side 20c of the heat exchanger itself.

It shall be noted that the feeding duct 29, formed between the walls 21, 22 of the exchanger 20 is completely separated from the chamber 26 through the same welding 27 that also guarantees the liquid-tight sealing.

Figure 2:
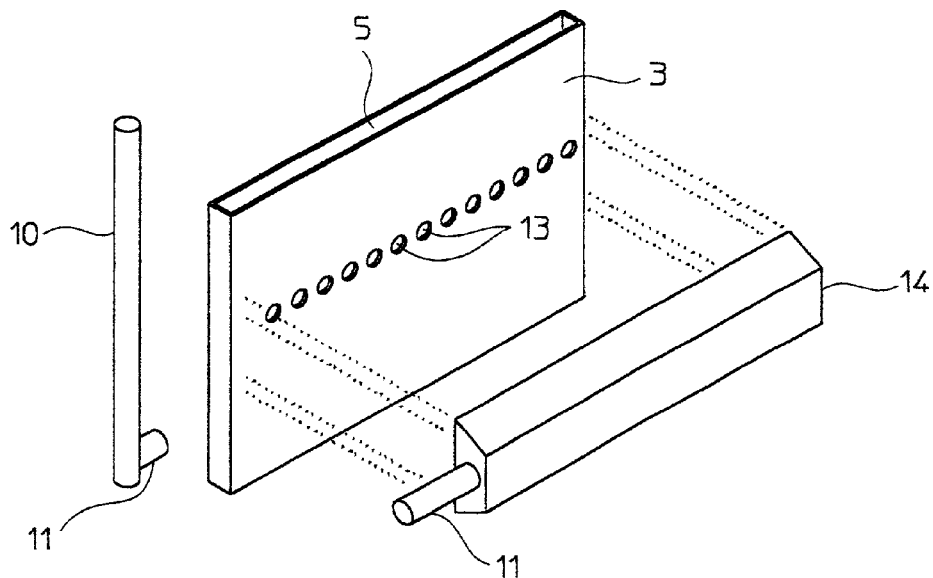
FIG. 2 shows schematically and in enlarged and exploded view a detail of the exchanger of FIG. 1.
Figure 3:
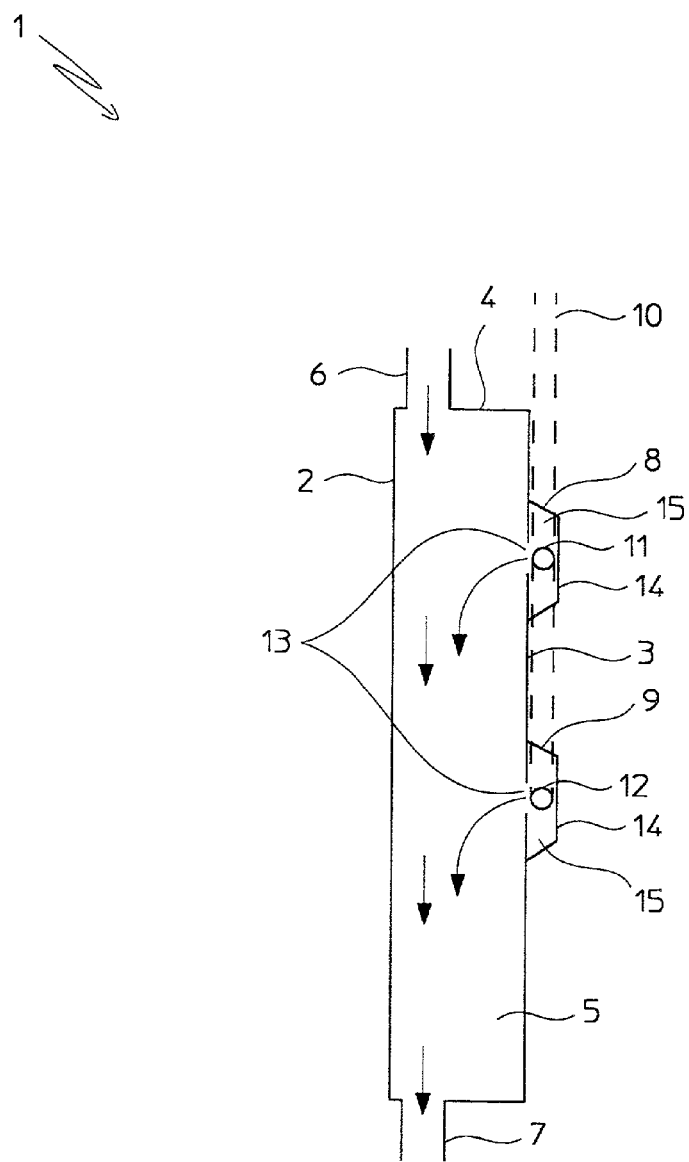
FIG. 3 shows an enlarged view along the line III—III of the exchanger of FIG. 1.

Onto a plate, for example the plate 22 of the heat exchanger 20, two or more distributors 30, 31 are fastened, that are structurally and functionally similar to the distributors above described with reference to the FIGS. 1–3. These distributors 31, 30 are in fluid communication both with the chamber 26, through a plurality of holes 32 formed in the corresponding plate, and with the feeding duct 29, through respective openings 33 provided in suitable positions of the duct 29.

The so conceived invention is subject to variations and changes, all falling within the scope of protection defined by the following claims.

For example, according to a not shown alternative embodiment of the present invention, the distributors 8–9 and 30–31 can be fixed symmetrically to both walls 2, 3, and 21, 22, respectively, of the heat exchanger.

In this way, during the feeding of the operating fluid of the second flow into the heat exchanger, its pressure drop is decreased. This allows to operate with a lower feeding velocity of the second flow with respect to the above described example, and thus to make its inlet into the heat exchanger easier. Further on, such decrease of the pressure drop advantageously implies a lower overall pressure drop of the heat exchanger.

A further advantage resulting from this embodiment is given by the fact that it is possible to decrease the thickness of the distributors. This promotes a homogeneous settlement of the catalyst possibly present in the reaction environment in which the heat exchanger is arranged, and facilitates the loading and discharging operations of the same in and from the reaction environment.

The invention claimed is:

1. Method for carrying out in continuous, under pseudo-isothermal conditions and in a predetermined reaction environment, a selected chemical reaction, comprising the steps of feeding a first flow of a heat exchange operating fluid at a respective predetermined inlet temperature in at least one tubular heat exchanger provided in said reaction environment said fluid passing through said at least one heat exchanger according to a respective inlet/outlet path, the method further comprising feeding into said at least one heat exchanger and at one or more intermediate positions of said path, a second flow of operating fluid having a respective predetermined inlet temperature.

2. Heat exchanger comprising two wide walls (2, 3; 21, 22), a chamber (5, 26) defined between said walls (2, 3; 21, 22) for being passed through by a heat exchange operating fluid, a fluid inlet connector (6, 24) and a fluid outlet connector (7, 25) in and from said chamber (5, 26) respectively, at least a distributor, (8, 9; 30, 31) of operating fluid, fixed to a wide surface of at least one of said wide walls (2, 3; 21, 22) at a predetermined distance from said connectors (6, 7; 24, 25) and in fluid communication with said chamber (5, 26), at least a duct (10, 28–29) for feeding said operating fluid, in communication with said at least one distributor (8, 9; 30, 31).

3. Heat exchanger according to claim 2, wherein said distributor (8, 9; 30, 31) comprises a plurality of through holes (13, 32) formed in said wall (3, 22) and a casing (14), fixed externally to said wall (3, 22) to cover said holes (13, 32) and defining with it a fluid distribution chamber (15).

4. Heat exchanger according to claim 3, wherein said through holes (13, 32) are arranged according to at least a rectilinear alignment.

5. Heat exchanger according to claim 2, wherein said feeding duct (10) is associated externally to said exchanger (1) and is in fluid communication with said at least one distributor (8, 9) through a respective connector (11, 12).

6. Heat exchanger according to claim 2, wherein said feeding duct (29) is formed between said large walls (21, 22), separated in a liquid-tight way from said chamber (26) and is in fluid communication with said at least one distributor (30, 31) through at least a through hole (33), formed in the feeding duct (29).

* * * * *